Figure 3:
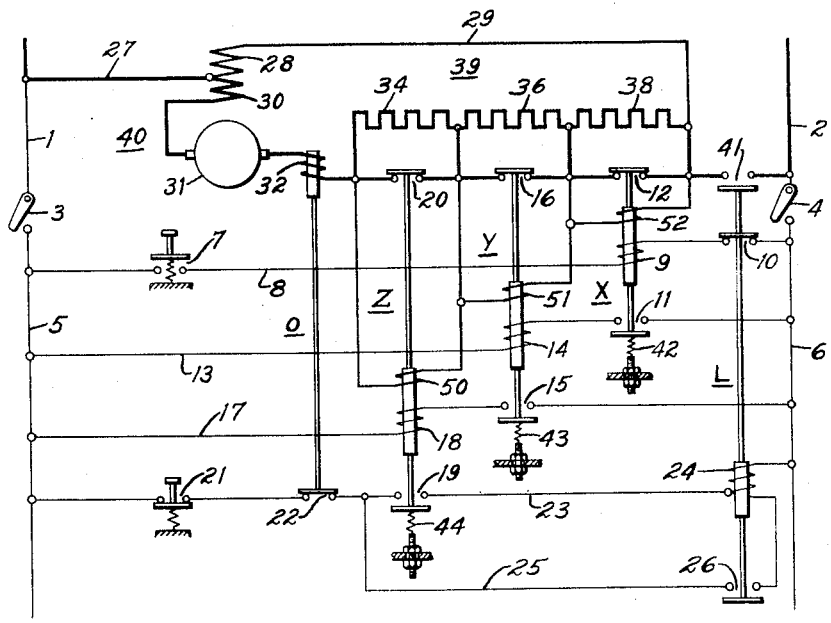

Nov. 7, 1933.                W. SCHAELCHLIN                1,934,512
                         CURRENT LIMIT ACCELERATION
                          Filed Aug. 26, 1931          2 Sheets-Sheet 1
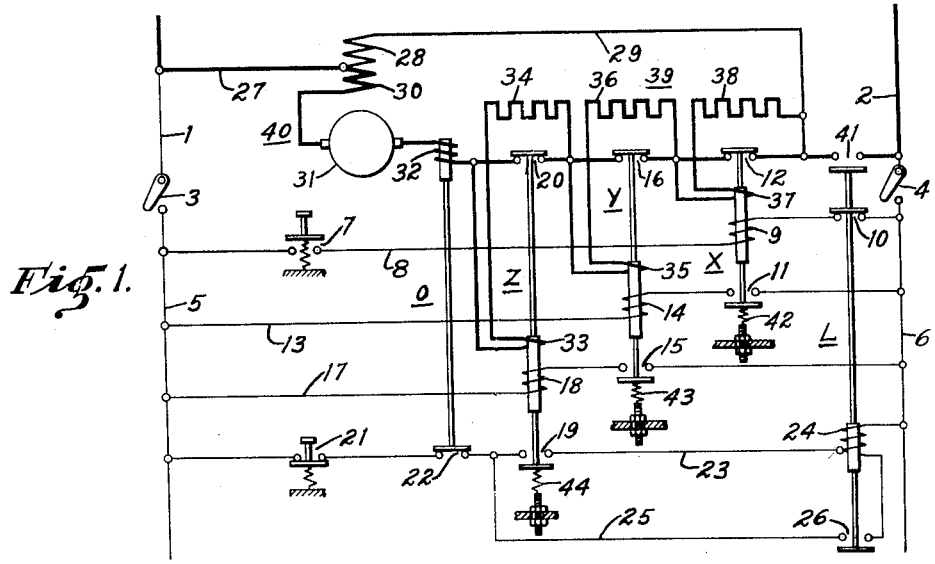
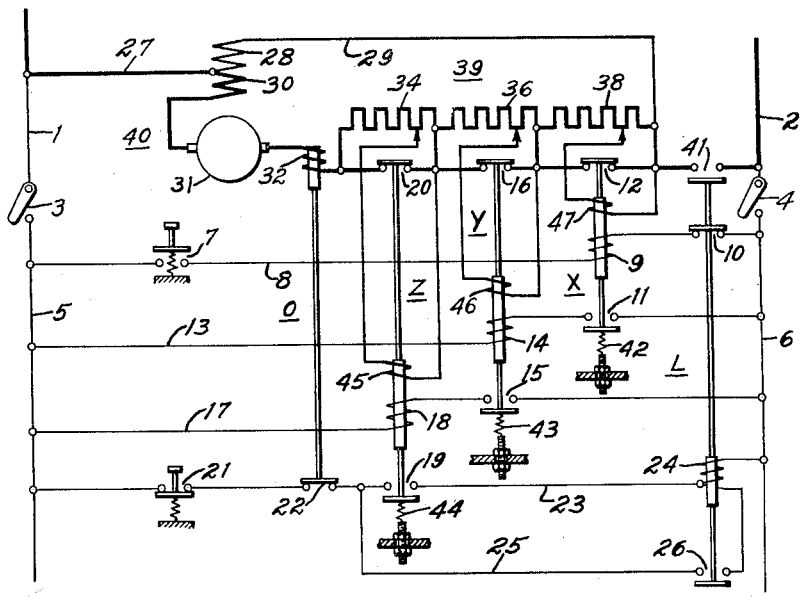
WITNESSES:
R. S. Williams
Paul E. Friedemann
INVENTOR
Walter Schaelchlin.
BY W. R. Coley
ATTORNEY Nov. 7, 1933.  W. SCHAELCHLIN  1,934,512
CURRENT LIMIT ACCELERATION
Filed Aug. 26, 1931  2 Sheets-Sheet 2

WITNESSES:
R.S. Williams
Paul E. Friedemann

INVENTOR
Walter Schaelchlin.
BY W.R. Coley
ATTORNEY

Patented Nov. 7, 1933

1,934,512

UNITED STATES PATENT OFFICE 1,934,512

CURRENT LIMIT ACCELERATION

Walter Schaelchlin, Wilkinsburg, Pa., assignor to Westinghouse Electric & Manufacturing Company, a corporation of Pennsylvania Application August 26, 1931. Serial No. 559,427

3 Claims. (Cl. 172—288)

This invention relates to an electrical control system for starting and stopping an electric motor.

More specifically, this invention relates to a system of control for electric motors, wherein the motor is accelerated to full operating speed in successive steps and wherein these steps may be adjusted to take place in successive equal, or when desired, unequal intervals of time after certain operating conditions are present in the motor.

Devices of this general character, utilizing the change in armature current during acceleration to control the acceleration, are well known in the art, but such devices must of necessity include a plurality of "set-up" relays and auxiliary control circuits, thereby very materially increasing the cost and complexity of the control system. With the existing devices, the time of acceleration of the motor cannot be effectively controlled and because of the complexity of the control systems, their reliability is materially impaired.

One of the objects of this invention is to provide a control system for electric motors that shall be simple, efficient and reliable and which may be readily and economically manufactured.

A further object of this invention is to directly control the shunting of the accelerating resistors of motors in response to predetermined armature currents and the inductive time constants of electrical devices.

A more specific object of this invention is the provision of accelerating contactors responsive successively to a predetermined change in operating conditions of the dynamo-electric machine controlled and the inductive time constants of electrical devices.

A broader object of this invention is to accelerate an electric motor, by successively changing the electrical characteristics of the motor armature circuit predetermined equal or unequal time intervals after predetermined equal or unequal armature currents have been attained.

Other, and more specific, objects of this invention will become apparent from a study of the following specification, when considered in conjunction with the accompanying drawings, in which:

Figure 1 is a diagrammatic showing of a system of control disclosing one modification of my invention; and Figs. 2 and 3 are diagrammatic showings of further modifications of my control system.

Referring more particularly to Fig. 1, reference character 40 designates a compound-wound direct-current motor disposed to be connected to a pair of buses 1 and 2 that are energized from a suitable source of direct-current power, not shown.

A line contactor L is disposed to connect the motor circuits to the buses 1 and 2, and a plurality of accelerating contactors X, Y and Z are provided for controlling the rate of acceleration of the motor 40.

The control system is also provided with an overload protective relay O, a starting push-button switch 7 and a stop push-button switch 21.

To more readily and completely understand the objects of my invention, a detailed discussion of the sequence of operation thereof will be given. Assuming that the buses 1 and 2 are energized and that the knife switches 3 and 4 are in circuit-closing positions, the conductors 5 and 6 are thereby energized.

Assuming that it is desired to start the motor 40, the start push-button switch 7 is actuated to establish a circuit from the energized conductor 5, through the push-button switch 7, conductor 8, magnetizing coil 9, of the accelerating contactor X, back contact members 10 of the line contactor L to the energized conductor 6. The energization of the coil 9 causes the operation of the accelerating contactor X, thereby interrupting the circuit at the contact members 12 and closing the contact members 11 to establish an energizing circuit for the magnetizing coil 14 of the accelerating contactor Y.

The accelerating contactor X, after operation as just explained, establishes a circuit from the energized conductor 5, through conductor 13, magnetizing or actuating coil 14 of the accelerating contactor Y, and closed contact members 11 of the accelerating contactor X to the energized conductor 6. Operation of the accelerating contactor Y causes the interruption of the circuit at contact members 16 and establishes a circuit for the actuating or magnetizing coil 18 of the accelerating contactor Z, the circuit for this coil 18 extending from the energized conductor 5 through conductor 17, coil 18, and closed contact members 15 of the accelerating relay Y to the energized conductor 6.

Operation of the last accelerating contactor Z establishes a circuit for the actuating coil 24 of the line contactor L, the circuit for this coil 24 extending from the energized conductor 5, through the stop push-button switch 21, back contact members 22 of the overload protective device O, the closed contact members 19 of the accelerating contactor Z, conductor 23 and coil 24 to the energized conductor 6. The operation of the line contactor, aside from establishing the motor circuits hereinafter discussed more in detail, provides its own holding circuit through conductor 25, and the closed contact members 26 to the coil 24. The contactors X, Y and Z, therefore, exert no further control on the line contactor L.

From the foregoing discussion, it will be apparent that the actuating coil 24 of the line contactor L cannot be energized until all of the accelerating contactors have moved to their respective open-circuit positions, thereby inserting all of the starting resistor sections 34, 36 and 38 in circuit with the motor 40 before the contact members 41 of the line contactor L are moved to circuit-closing position.

As heretofore explained, the contact members 41, once in circuit-closing position, will remain in such position regardless of the accelerating contactors, and the contact members 41 are caused to move to open circuit position only when the stop push-button switch 21 is actuated or the contact members 22 are interrupted or opened by the operation of the overload protective relay O.

With the operation of the line contactor L, the shunt field winding 28 of the motor 40 is energized by a circuit extending from the energized conductor 1 through conductor 27, shunt field winding 28, conductor 29, contact members 41 of the line contactor L to the energized conductor 2. A motor armature circuit is also established, this circuit extending from the energized conductor 27 through the series field winding 30, armature 31, actuating coil 32 of the overload protective relay O, retaining coil 33 of the accelerating contactor Z, section 34 of the starting resistor 39, retaining coil 35 of accelerating contactor Y, resistor section 36 of the starting resistor, retaining coil 37 of the accelerating contactor X, resistor section 38 of the starting resistor and the contact members 41 of the line contactor L to the energized conductor 2.

It will be noted that the operation of the line contactor L causes the interruption of the circuit for the magnetizing coil 9 of the accelerating contactor X at the contact members 10. Immediately after closing of the line contactor the armature current will be of considerable value. The retaining coil 37, which is connected in series with starting resistor 38 and which has but few ampere-turns even for a heavy armature current, will hold the contact members 12 in open-circuit position. After the armature current has dropped to a predetermined value, the armature of the accelerating contactor X will begin to descend.

The accelerating contactor X is designed to have a considerable inductive time constant, which constant is determined by the electromagnetic characteristics of the contactor as well as the adjustment of its adjustable spring 42. By a proper adjustment of the spring 42 and a proper selection of the ampere turns for coil 37, the time of closing of the contact members 12 after the armature current has dropped to a selected value, can be predetermined within very exact limits. The time of closing of the contact members 12 after the closing of the contact members 41 is thus determined by a predetermined armature current plus a substantially predetermined interval of time.

After the contact members 12 are closed, the resistor section 38 and retaining coil 37 are removed from the motor armature circuit by the shunt circuit established through the contact members 12, and the effective voltage on the motor armature is increased, thereby further accelerating the motor 40.

Operation of the accelerating contactor X, causes the opening of its contact members 11, thereby deenergizing the magnetizing or actuating coil 14 of the accelerating contactor Y. When the magnetizing coil 14 is deenergized, the armature of this contactor, if the armature current has not dropped to a second predetermined value, will be retained in its upper position, thus holding the contact members 16 in open-circuit position.

The accelerating contactor Y may be in every respect similar in design and function to the accelerating contactor X, except that the ampere turns of series coil 35 may be different for purposes of holding the contactor armature in the upper position. The characteristics of spring 43 may also be different from the characteristics of spring 42. In view of these differences, when the motor armature current has dropped to some second predetermined value, the armature of contactor Y begins to descend and, after a predetermined interval of time, the contact members 15 are moved to open-circuit position and the contact members 16 are moved to circuit-closing position. The actuating coil 18 of the accelerating contactor Z is, therefore, deenergized and the contact members 16 effect the shunting of the starting resistor section 36 and the series coil 35.

The accelerating contactor Z is of the same design as the other accelerating contactors, except that the electromagnetic characteristics of coil 33 and the adjustment of spring 44 may be different.

After the contactor Z has operated, the last resistor section 34 and coil 33 are shunted at the contact members 20, and the motor 40, therefore, attains full or normal operating speed.

With devices using current limit only, the acceleration may take place too rapidly. Furthermore, in such devices, set-up circuits and additional relays are necessary, and, since the line contactor in such devices closes before the accelerating contactors open, a heavy current must be interrupted at the shunting contact members thereby shortening the life of the starting controller.

When time limit control only is utilized, difficulty is experienced in selecting the proper time constants. The acceleration, therefore, does not proceed as a function of the operating condition of the motor. The foregoing disadvantages are completely eliminated by my invention which, in addition to its electrical advantages, provides the trade with a starting controller involving only about half as many units as former controllers, requiring but half the space and costing considerably less than starting controllers heretofore supplied to the public.

If it is desired to stop the operation of the motor, the stop push-button switch 21 is actuated, thereby deenergizing the actuating coil 24 of the line contactor L, and in consequence, interrupting the motor circuit at contact members 41. However, since the starting switch 7 is in open-circuit position, the closing of the contact members 10 does not cause inadvertent energization of the magnetizing coil 9 to automatically restart the motor.

The resistor-short-circuiting contact members 12, 16 and 20 are normally in circuit-closing position and are held in such position by the springs 42, 43 and 44. Generally stated, the starting of the motor takes place in two steps. First, the accelerating contactors are opened to insert the starting resistor in the motor-armature circuit. Thereafter the line switch contact members 41 close and automatically cause the above-described sequential shunting of the starting resistor 39.

The modifications shown in Figs. 2 and 3 show different retaining coils from those disclosed in Fig. 1, the illustrated circuits being otherwise the same.

In the modification shown in Fig. 2, the accelerating contactors X, Y and Z are provided with retaining coils 47, 46 and 45, respectively. These coils are not connected in series with the motor armature circuit but are nevertheless current coils connected in shunt relation to a small portion of each starting resistor section. In some applications, this modification presents design as well as operating advantages.

In the modification shown in Fig. 3, the retaining coils 52, 51 and 50 are voltage coils connected across a part or all of the respective starting resistor sections. In some applications, this modification presents advantages.

I do not wish to be restricted to the specific structural details, arrangement of parts or circuit connections herein set forth, as various further modifications thereof may be effected without departing from the spirit and scope of my invention. I desire, therefore, that only such limitations shall be imposed as are indicated in the appended claims.

I claim as my invention:

1. In a control system, the combination with a motor having a starting resistor, a source of energy, a line switch for connecting the motor and resistor to the source of energy, a contactor biased to shunt said resistor, an interlock on the line switch, an actuating coil for the contactor, a starting switch for connecting said coil to said source through said interlock, circuit connections, an auxiliary switch on the contactor coacting with said circuit connections for effecting the operation of the line switch to connect the motor to the source of energy and disconnect the coil from said source of energy, and a coil, responsive to the armature current of the motor, for delaying the movement of the contactor to shunt said resistor.

2. In a control system, the combination with a dynamo-electric machine having an armature and current limiting resistors therefor, a source of energy, a line switch for connecting the machine and resistors to said source of energy, a plurality of contactors biased to shunt said resistors, an interlock on the line contactor, a starting switch, an actuating coil of one resistor shunting contactor connected to said source through the starting switch and said interlock whereby said contactor is moved to its non-resistor-shunting position, an auxiliary switch on the contactor for energizing a second contactor, an auxiliary switch on the second contactor for energizing the third, an auxiliary switch on said third contactor for energizing the line switch whereby the contactors are successively deenergized, and coils responsive to the armature current for delaying the operation of said contactors to their respective biased positions.

3. In a control system, the combination with a motor having a starting resistor, a source of energy, a plurality of contactors normally biased to shunt sections of said starting resistor, a line switch, means controlled by said line switch for successively energizing said contactors to operate to open the shunts of the starting resistors, means responsive to the operation of the contactor last energized to effect the operation of the line switch to connect the motor to the source of energy and to initiate the successive deenergization of the contactors, and coils on said contactors responsive to the armature current for delaying the successive shunting of the sections of the starting resistor.

WALTER SCHAELCHLIN.